(12) United States Patent
Ha et al.

(10) Patent No.: US 12,540,752 B2
(45) Date of Patent: Feb. 3, 2026

(54) AIR CLEANER

(71) Applicant: LG ELECTRONICS INC., Seoul (KR)

(72) Inventors: Jiug Ha, Seoul (KR); Kangeui Cho, Seoul (KR); Sungkyong Han, Seoul (KR); Sehwan Bae, Seoul (KR); Myungwhoon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 725 days.

(21) Appl. No.: 17/917,679

(22) PCT Filed: Feb. 17, 2021

(86) PCT No.: PCT/KR2021/002019
§ 371 (c)(1),
(2) Date: Oct. 7, 2022

(87) PCT Pub. No.: WO2021/206286
PCT Pub. Date: Oct. 14, 2021

(65) Prior Publication Data
US 2023/0152000 A1    May 18, 2023

(30) Foreign Application Priority Data

Apr. 8, 2020   (KR) .......................... 10-2020-0042859

(51) Int. Cl.
*F24F 13/14*   (2006.01)
*B01D 46/00*   (2022.01)
*F24F 13/28*   (2006.01)

(52) U.S. Cl.
CPC .......... *F24F 13/14* (2013.01); *B01D 46/0047* (2013.01); *F24F 13/28* (2013.01); *B01D 2273/30* (2013.01)

(58) Field of Classification Search
None
See application file for complete search history.

(56) References Cited

U.S. PATENT DOCUMENTS 6,233,138 B1 *   5/2001   Osgood ................. G06F 1/1679
                                                    248/920
6,288,891 B1 *   9/2001   Hasegawa .............. F16M 11/10
                                                    361/679.22
(Continued)

FOREIGN PATENT DOCUMENTS

CN         103502715 A      1/2014
CN         103576772 A      2/2014
(Continued)

OTHER PUBLICATIONS

WO-2021201334-A1 (Year: 2021) abstract of FOR listed above.*

*Primary Examiner* — Brit E. Anbacht
(74) *Attorney, Agent, or Firm* — Birch, Stewart, Kolasch & Birch, LLP

(57) ABSTRACT

Disclosed is an air cleaner, more specifically, an air cleaner including a blower that inhales air from the outside, and filters the inhaled air, and discharges the filtered air, a flow adjusting device disposed on the blower to inhale the air discharged from the blower, adjust a discharge direction of the inhaled air, and discharge the air, and a guide member disposed below the flow adjusting device to change a state of the flow adjusting device. An angle formed between a top surface of the flow adjusting device and a top surface of the blower may increase or decrease based on operations of the plurality of links, so that the state of the flow adjusting device may be changed from an orientation in which the top surface of the flow adjusting device is horizontal with the top surface of the blower to an orientation in which the top surface of the flow adjusting device is perpendicular to the top surface of the blower.

19 Claims, 6 Drawing Sheets

(56) References Cited

U.S. PATENT DOCUMENTS

| | | | | |
|---|---|---|---|---|
| 6,532,147 B1* | 3/2003 | Christ, Jr. | ............ | G06F 1/1679 |
| | | | | 248/922 |
| 7,630,193 B2* | 12/2009 | Ledbetter | .............. | G06F 1/1677 |
| | | | | 361/679.21 |
| 8,183,459 B2* | 5/2012 | Wei | ....................... | G06F 1/1624 |
| | | | | 379/433.05 |
| 11,525,589 B2* | 12/2022 | Son | .......................... | F24F 8/10 |
| 2005/0081556 A1* | 4/2005 | Kim | ......................... | F24F 8/22 |
| | | | | 62/411 |
| 2009/0011802 A1* | 1/2009 | Malthe | ................ | H04M 1/0216 |
| | | | | 455/575.1 |
| 2014/0043736 A1* | 2/2014 | Onda | ................... | F16M 11/048 |
| | | | | 361/679.01 |
| 2014/0346292 A1 | 11/2014 | Tabata | | |
| 2017/0246570 A1* | 8/2017 | Park | ........................ | B01D 46/24 |
| 2017/0246572 A1* | 8/2017 | Park | ........................ | F24F 8/80 |
| 2017/0246576 A1* | 8/2017 | Jung | ........................ | B01D 46/24 |
| 2017/0246578 A1* | 8/2017 | Jung | ........................ | B01D 46/24 |
| 2017/0246579 A1* | 8/2017 | Mun | ................. | B01D 46/0008 |
| 2017/0246580 A1* | 8/2017 | Bae | ........................ | F24F 8/108 |
| 2017/0246581 A1* | 8/2017 | Jung | ........................ | F24F 8/10 |
| 2017/0246582 A1* | 8/2017 | Park | ........................ | F24F 8/80 |
| 2017/0248153 A1* | 8/2017 | Park | ..................... | F04D 29/703 |
| 2017/0248339 A1* | 8/2017 | Mun | ................. | B01D 46/0047 |
| 2018/0001248 A1* | 1/2018 | Jung | ................. | B01D 46/2411 |
| 2019/0264948 A1* | 8/2019 | Jung | ........................ | A61L 2/22 |
| 2020/0158357 A1* | 5/2020 | Son | ....................... | F04D 25/166 |
| 2021/0278097 A1* | 9/2021 | Min | ........................ | F24F 13/20 |
| 2022/0008855 A1* | 1/2022 | Yang | ........................ | F24F 8/10 |
| 2022/0008856 A1* | 1/2022 | Yang | .................. | B01D 46/0049 |
| 2022/0010991 A1* | 1/2022 | Yang | ........................ | F24F 8/80 |
| 2022/0011009 A1* | 1/2022 | Lee | ......................... | F24F 13/20 |
| 2022/0011011 A1* | 1/2022 | Yang | ..................... | F24F 13/082 |
| 2022/0032222 A1* | 2/2022 | Park | ........................ | B01D 46/42 |
| 2022/0161176 A1* | 5/2022 | Kim | ....................... | B01D 46/0013 |
| 2022/0186950 A1* | 6/2022 | Park | ........................ | F24F 13/28 |
| 2022/0401867 A1* | 12/2022 | Mun | ........................ | A61L 9/22 |
| 2024/0017199 A1* | 1/2024 | Lee | ......................... | F24F 8/10 |
| 2024/0019142 A1* | 1/2024 | Lee | .................... | B01D 46/0086 |
| 2024/0035702 A1* | 2/2024 | Lee | ......................... | F24F 8/80 |
| 2024/0255002 A1* | 8/2024 | Park | ........................ | F01P 7/16 |

FOREIGN PATENT DOCUMENTS

| | | | | |
|---|---|---|---|---|
| CN | 106931525 A | | 7/2017 | |
| CN | 210050882 U | | 2/2020 | |
| CN | 111256233 A | * | 6/2020 | ................ F24F 8/80 |
| EP | 2696255 A2 | * | 2/2014 | ........... G06F 1/1624 |
| JP | 2000-266395 A | | 9/2000 | |
| KR | 10-2004-0106057 A | | 12/2004 | |
| KR | 10-2018-0076461 A | | 7/2018 | |
| KR | 10-2019-0058431 A | | 5/2019 | |
| KR | 20220028402 A | * | 3/2022 | ........ B01D 46/0047 |
| WO | WO 2011/043123 A1 | | 4/2011 | |
| WO | WO 2018/106032 A1 | | 6/2018 | |
| WO | WO-2021201334 A1 | * | 10/2021 | .............. F24F 11/79 |

* cited by examiner

[Figure 1]
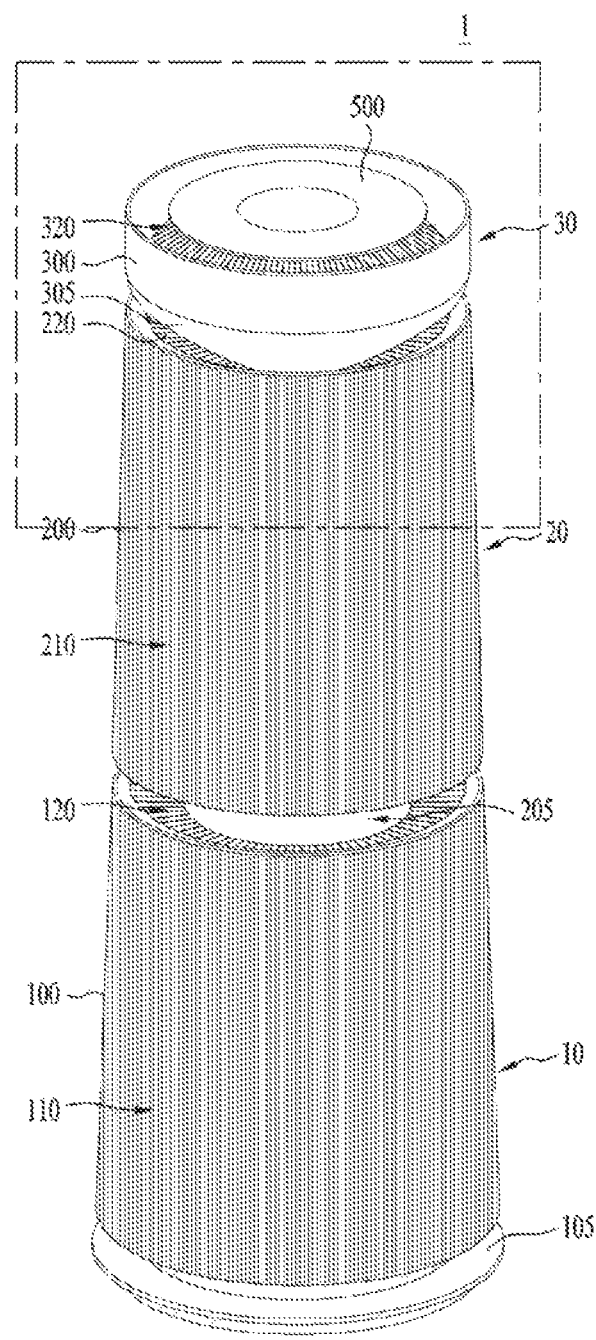

[Figure 2]
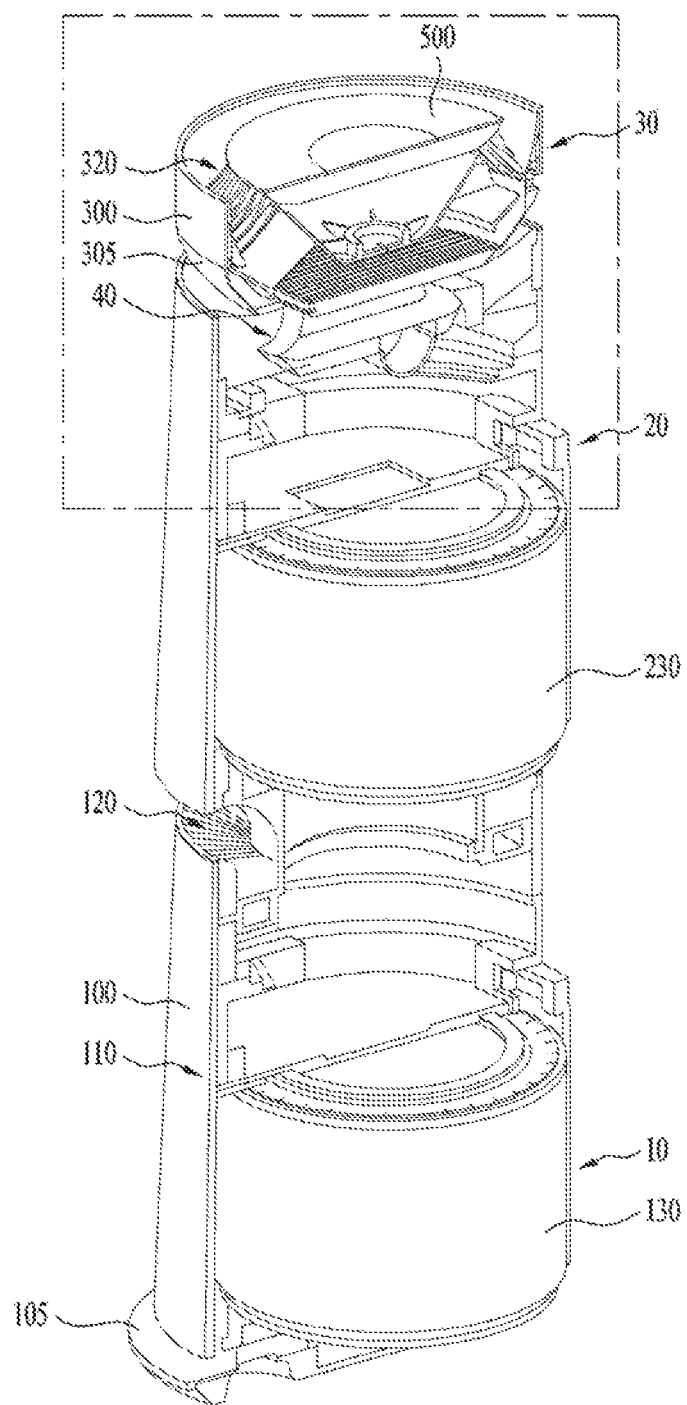

[Fig. 3]
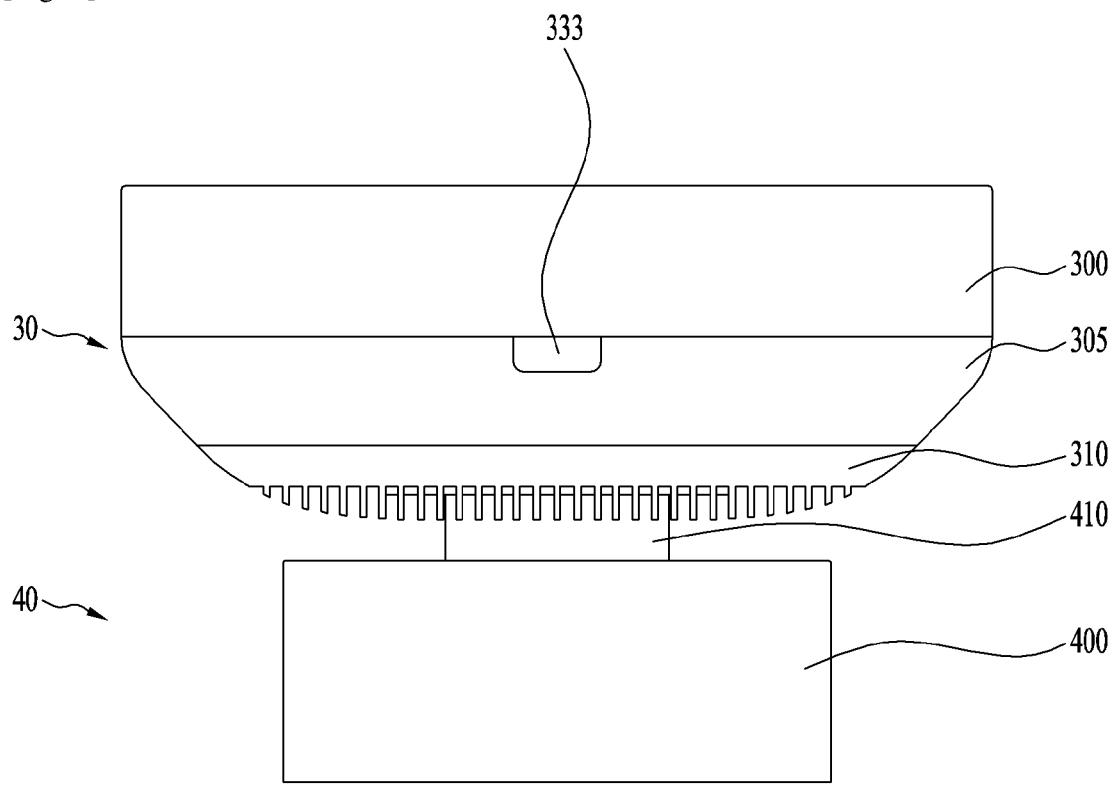
[Fig. 4]
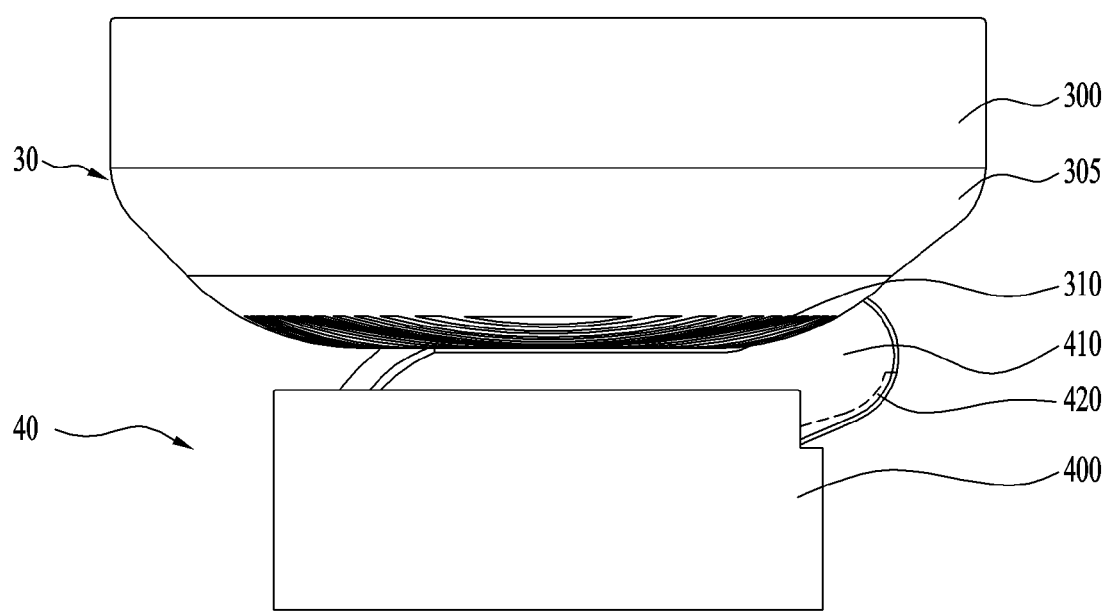

[Fig. 5]
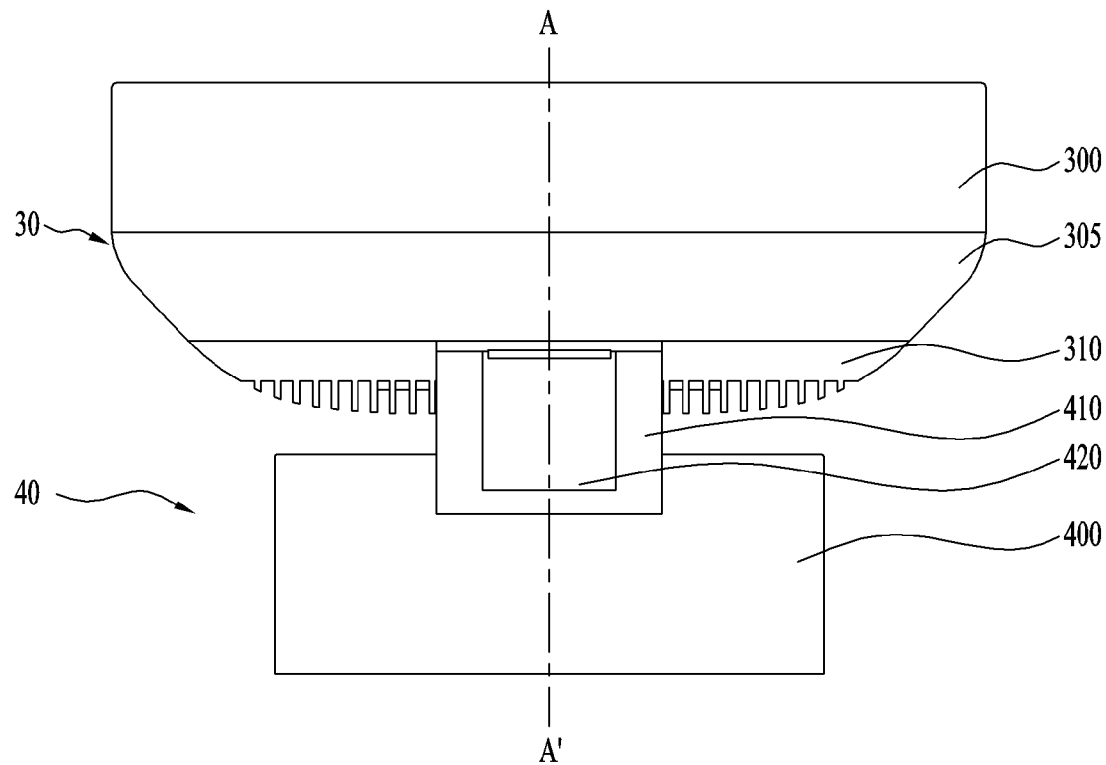
[Fig. 6]
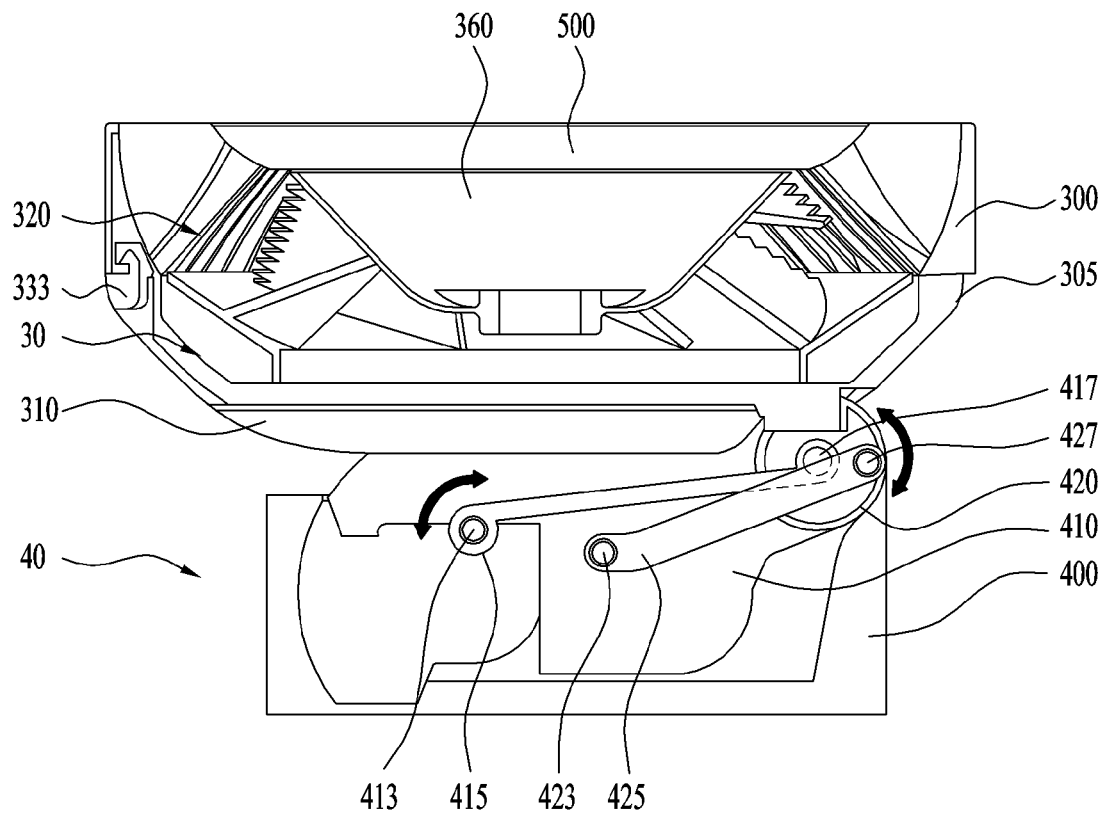

[Fig. 7]
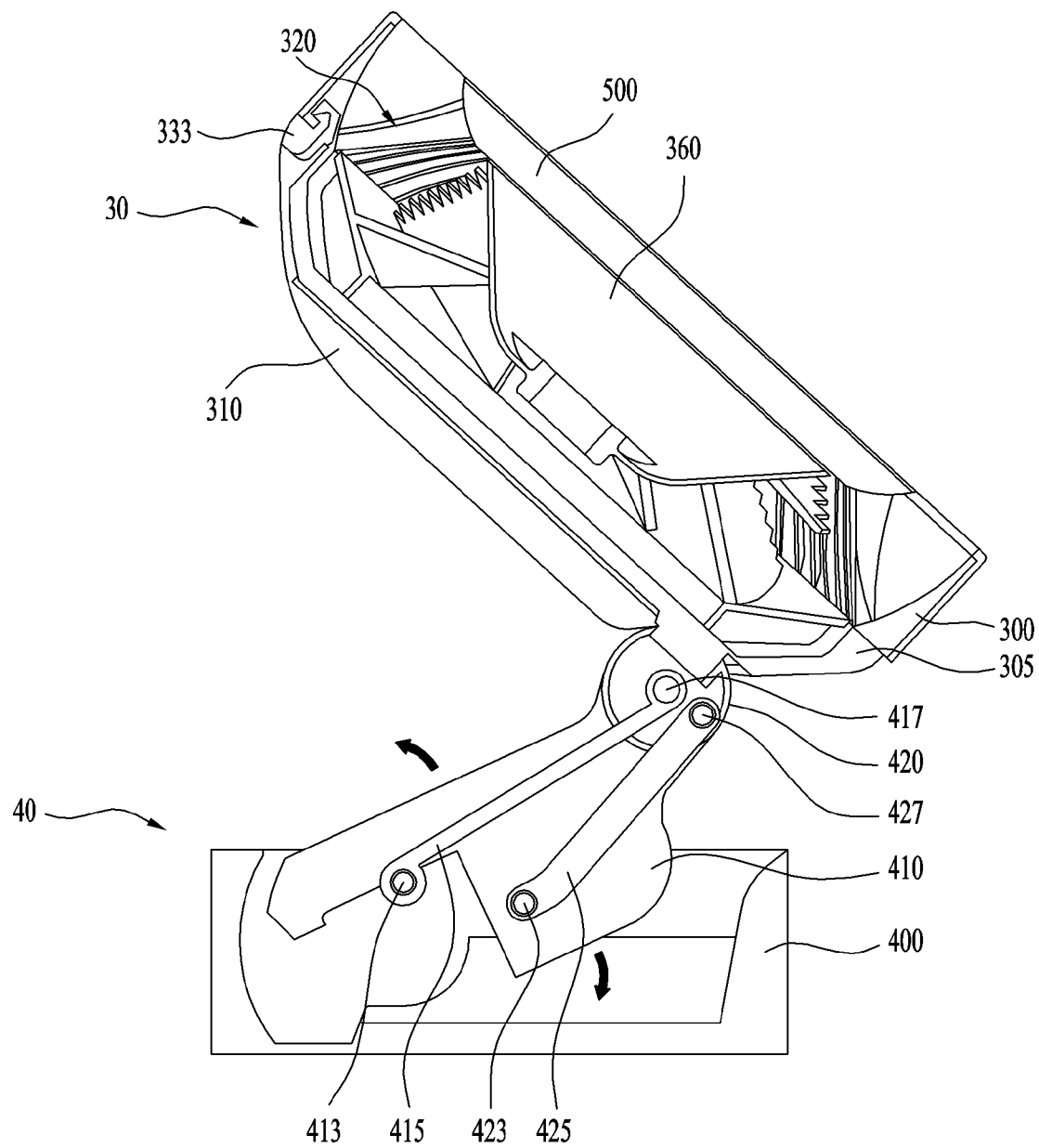

[Fig. 8]
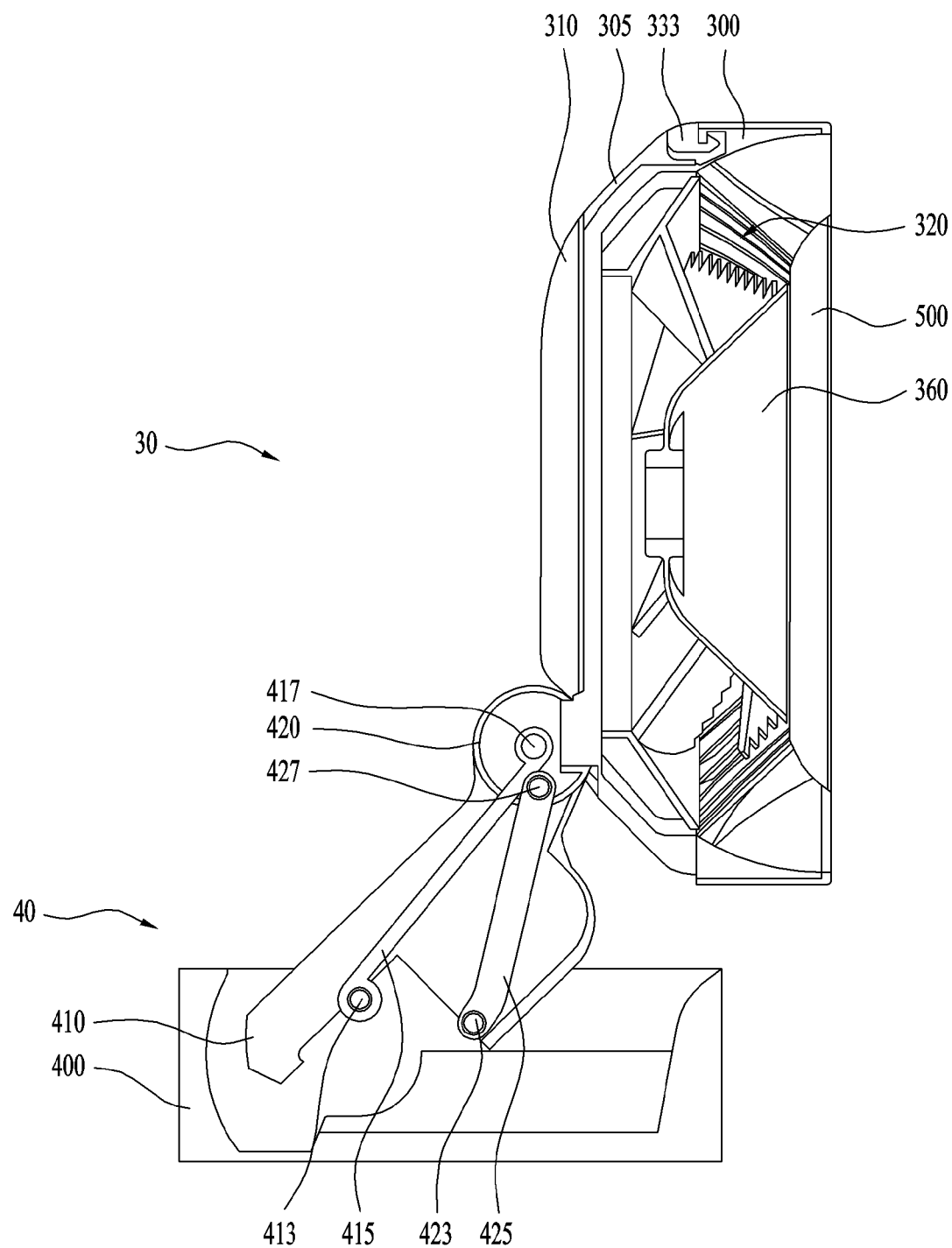

AIR CLEANER

CROSS REFERENCE TO RELATED APPLICATIONS

This application is the National Phase of PCT International Application No. PCT/KR2021/002019, filed on Feb. 17, 2021, which claims priority under 35 U.S.C. 119(a) to Patent Application No. 10-2020-0042859, filed in the Republic of Korea on Apr. 8, 2020, all of which are hereby expressly incorporated by reference into the present application.

TECHNICAL FIELD

The present disclosure relates to an air cleaner.

BACKGROUND ART

An air cleaner is understood as an appliance that inhales and filters contaminated air and then discharges the filtered air, and is configured to purify an indoor space such as a home or an office. Generally, the air cleaner includes a blower configured to inhale external air and discharge the inhaled air, and a filter disposed inside the blower to filter dust, bacteria, and the like in the air. In this connection, the air cleaner may further include a flow adjusting device configured to adjust a discharge direction of the air discharged from the blower. However, because an operating radius of the flow adjusting device is limited, air is not able to be blown in a desired direction.

Prior art (Korean Patent Application Publication No. 10-2017-0101100, hereinafter, referred to as prior art 1) discloses an air cleaner further including the flow adjusting device configured to adjust the discharge direction of the air discharged from the blower. In the air cleaner of the prior art 1, the air inhaled into the blower is filtered by the filter disposed inside the blower and then discharged in a vertical direction perpendicular to a top surface of the blower. Thereafter, the air discharged from the blower is blown in a direction other than the vertical direction through the flow adjusting device.

However, even with the air cleaner of the prior art 1, there is an inconvenience that the air discharged from the blower is only blown in the vertical direction or in a direction forming a predetermined angle with respect to the top surface of the blower, but is not able to be blown in a horizontal direction parallel to the top surface of the blower.

Another prior art (Korean Patent Application Publication No. 10-2019-0120126, hereinafter, referred to as prior art 2) discloses an air cleaner that includes the flow adjusting device configured to adjust the discharge direction of the air discharged from the blower, and a rotation guide configured to induce rotation of the flow adjusting device. In the air cleaner of prior art 2, a position of the flow adjusting device may be changed based on a degree of withdrawal of the rotation guide, and the air discharged from the blower may be blown in a direction other than the vertical direction through the flow adjusting device based on the degree of withdrawal of the rotation guide.

However, even with the air cleaner of prior art 2, because a space defined inside the blower in which the rotation guide may be disposed is limited, a length of the rotation guide for changing an orientation to reach an orientation in which a top surface of the flow adjusting device is vertical to the top surface of the blower is not able to be secured. Accordingly, there is a limit in that it is difficult to blow the air discharged from the blower in the desired direction.

DISCLOSURE OF INVENTION

Technical Problem

An object of the present disclosure is to provide an air cleaner that may discharge filtered air in a horizontal direction parallel to a top surface of a blower.

Another object of the present disclosure is to provide an air cleaner including a flow adjusting device that allows orientation change from an orientation in which a top surface of the flow adjusting device is horizontal with a top surface of a blower to an orientation in which the top surface of the flow adjusting device is perpendicular to the top surface of the lower.

Solution to Problem

An air cleaner according to exemplary embodiments of the present disclosure may include a blower that inhales air from the outside, and filters the inhaled air, and discharges the filtered air, a flow adjusting device disposed on the blower to inhale the air discharged from the blower, adjust a discharge direction of the inhaled air, and discharge the air, and a guide member disposed below the flow adjusting device to change an orientation of the flow adjusting device. The guide member may include a plurality of links having different lengths. An angle formed by a top surface of the flow adjusting device and a top surface of the blower increases or decreases based on operations of the plurality of links, so that an orientation may be changed from an orientation in which the top surface of the flow adjusting device is horizontal with the top surface of the blower to an orientation in which the top surface of the flow adjusting device is perpendicular to the top surface of the blower.

An air cleaner according to exemplary embodiments of the present disclosure may include a blower that inhales air from the outside, and filters the inhaled air, and discharges the filtered air, a flow adjusting device disposed on the blower to inhale the air discharged from the blower, adjust a discharge direction of the inhaled air, and discharge the air, and a guide member disposed below the flow adjusting device to change an orientation of the flow adjusting device. The guide member may include a plurality of links, and one end of each of the plurality of links may be pivotably connected to an inner portion of the guide member, and the other end of each of the plurality of links may be pivotably connected to a portion disposed on a bottom surface of the flow adjusting device. The flow adjusting device may vary the discharge direction of the air by pivoting of at least one of the plurality of links of the guide member.

The flow adjusting device may be oriented to be in a first position, a second position, and a third position based on an operation of the guide member, the first position may be an orientation where a top surface of the flow adjusting device is horizontal with a top surface of the blower, the second position may be an orientation where the top surface of the flow adjusting device has a predefined angle with respect to the top surface of the blower, and the third position may be an orientation where the top surface of the flow adjusting device is perpendicular to the top surface of the blower.

The guide member may include a first housing disposed on the top surface of the blower, a second housing coupled to the first housing to ascend and descend, a guide connector disposed to pivot by being coupled to the bottom surface of the flow adjusting device and a portion of the second housing, a first link having one end coupled to the inner portion of the first housing and the other end coupled to an inner portion of the guide connector, and a second link disposed to be spaced apart from the first link, and having one end coupled to the inner portion of the first housing and the other end coupled to the inner portion of the guide connector. The second link may have a length smaller than a length of the first link.

The first housing may include a first link connector disposed to be coupled to said one end of the first link, the guide connector may include a second link connector disposed to be coupled to the other end of the first link, said one end of the first link may be connected to the first link connector to pivot about the first link connector, and the other end of the first link may be connected to the second link connector to pivot about the second link connector.

The first housing may further include a third link connector disposed to be coupled to said one end of the second link, the guide connector may further include a fourth link connector disposed to be coupled to the other end of the second link, said one end of the second link may be connected to the third link connector to pivot about the third link connector, and the other end of the first link may be connected to the fourth link connector to pivot about the fourth link connector.

When the first link pivots, the second link may pivot in the same direction as a pivot direction of the first link.

The second link may pivot faster than the first link.

The second housing may pivot about the first link connector together with the first link.

When the first link pivots, the guide connector may pivot in a direction opposite to the pivot direction of the first link, and the fourth link connector may be connected to the second link connector to pivot about the second link connector together with the guide connector.

When the second housing pivots in a first direction, the guide connector may ascend from the first housing, and at the same time, pivot in a second direction opposite to the first direction.

When the guide connector pivots in the second direction, the fourth link connector may also pivot in the second direction together with the guide connector.

As the second housing pivots in the first direction, and at the same time the guide connector pivots in the second direction, the state of the flow adjusting device may be changed from the first position to the third position.

When the second housing pivots in the second direction, the guide connector may descend toward the first housing, and at the same time, pivot in the first direction.

When the guide connector pivots in the first direction, the fourth link connector may also pivot in the first direction together with the guide connector.

As the second housing pivots in the second direction, and at the same time the guide connector pivots in the first direction, the state of the flow adjusting device may be changed from the third position to the first position.

As the state of the flow adjusting device is changed from the first position to the third position, the second link connector and the fourth link connector may be positioned at higher vertical levels than before, respectively.

A vertical level increase degree of the fourth link connector may be less than a vertical level increase degree of the second link connector.

When the flow adjusting device is oriented in the second position or the third position, the fourth link connector may be disposed at a lower vertical level than the second link connector.

The first link and the second link may be respectively arranged on different planes, and the first link and the second link respectively may have portions overlapping with each other when the flow adjusting device is oriented in the first position.

The blower may include a first blower configured to inhale, filter, and blow air at a relatively low vertical level, and a second blower disposed on the first blower and configured to inhale, filter, and blow air at a relatively high vertical level. The first blower may include a first casing for defining appearance of the first blower, a first filter member disposed in a lower portion of an interior of the first casing to filter the air, and a first blow fan disposed in an upper portion of the interior of the first casing to generate air flow. The second blower may include a second casing for defining appearance of the second blower, a second filter member disposed in a lower portion of an interior of the second casing to filter the air, and a second blow fan disposed in an upper portion of the interior of the second casing to generate air flow. In addition, the guide member may be disposed between the second blow fan and the flow adjusting device.

Advantageous Effects of Invention

The air cleaner according to exemplary embodiments of the present disclosure may include the sequentially stacked blowers, the guide member, and the flow adjusting device, and the guide member may include the plurality of links. One end of each of the plurality of links may be pivotably connected to the inner portion of the guide member, and the other end of each of the plurality of links may be pivotably connected to the portion disposed on the bottom surface of the flow adjusting device. The flow adjusting device may be configured to vary the discharge direction of the air by the pivoting of the at least one of the plurality of links of the guide member.

In this connection, the angle formed between the top surface of the flow adjusting device and the top surface of the blower may increase or decrease based on the operations of the plurality of links, so that the state of the flow adjusting device may be changed from the state in which the top surface of the flow adjusting device is horizontal with the top surface of the blower to the state in which the top surface of the flow adjusting device is perpendicular to the top surface of the blower.

Therefore, the top surface of the flow adjusting device may be oriented to be perpendicular to the top surface of the blower. Thus, the air discharged from the blower may be blown farther away in the desired direction through the flow adjusting device.

In addition, the guide member according to exemplary embodiments of the present disclosure may have a stable and improved appearance because, compared to a driving scheme of the conventional guide member configured to be movable by being inserted into the blower or withdrawn from the top surface of the blower, not only more concise and natural driving is possible, but also a structure for driving the guide member is not exposed to the outside.

BRIEF DESCRIPTION OF DRAWINGS

FIGS. 1 and 2 are diagrams for illustrating an air cleaner according to exemplary embodiments of the present disclosure.

FIGS. 3 to 5 are diagrams for illustrating a flow adjusting device and a guide member according to exemplary embodiments of the present disclosure.

FIGS. 6 to 8 are diagrams for illustrating an orientation change of a flow adjusting device based on an operation of a guide member according to exemplary embodiments of the present disclosure.

MODE FOR THE INVENTION

Hereinafter, specific embodiments of the present disclosure will be described with reference to the drawings. The following detailed description is configured to aid in a comprehensive understanding of methods, devices and/or systems described herein. However, this is only an example, and the present disclosure is not limited thereto.

In describing the embodiments of the present disclosure, when it is determined that a detailed description of the publicly known technology related to the present disclosure may unnecessarily obscure the subject matter of the present disclosure, the detailed description will be omitted. In addition, terminologies to be described later are terminologies defined in consideration of functions in the present disclosure, which may vary depending on an intention of a user or an operator, customs, or the like. Therefore, the definitions of the terminologies should be made based on the contents throughout the specification. The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof.

In addition, in describing components of the embodiment of the present disclosure, terminologies such as first, second, A, B, (a), (b), and the like may be used. These terminologies are only used to distinguish the component from other components, and the nature, order, or order of the corresponding component is not limited by the terminology.

Hereinafter, a direction perpendicular to a ground is defined as a vertical direction. A direction parallel to the ground and perpendicular to the vertical direction is defined as a horizontal direction. A circumferential direction is defined as a virtual circular direction that is formed when an object rotates around the vertical direction at a rotation radius as a length of the horizontal direction.

FIGS. 1 and 2 are diagrams for illustrating an air cleaner according to exemplary embodiments of the present disclosure. Specifically, FIG. 1 is a diagram for illustrating an overall structure of an air cleaner, and FIG. 2 is a diagram for illustrating a component of the air cleaner.

Referring to FIGS. 1 and 2, an air cleaner 1 according to exemplary embodiments of the present disclosure may include a blower 10 and 20 configured to inhale air from the outside, and filter the inhaled air and discharge the filtered air, a flow adjusting device 30 disposed on the blower 10 and 20 and configured to inhale the air discharged from the blower 10 and 20, and adjust a discharge direction of the inhaled air, and a guide member 40 disposed between the blower 10 and 20 and the flow adjusting device 30, wherein one end thereof is connected to the blower 30 and the other end is connected to air the discharge assembly 30, wherein the guide member 40 is configured to induce an orientation change of the flow adjusting device 30.

The blower 10 and 20 includes a first blower 10 configured to inhale, filter, and blow air at a relatively low vertical level, and a second blower 20 disposed on the first blower 10 and configured to inhale, filter, and blow air at a relatively high vertical level. The first blower 10 and the second blower 20 may be stacked in the vertical direction, and may be fastened to each other via a variety of manners, such as fitting fastening, rivet fastening, and screw fastening.

The flow adjusting device 30 may be disposed on the second blower 20. The guide member 40 may be configured to be connected to the second blower 20 and the flow adjusting device 30. The guide member 40 and the second blower 20 may be fastened to each other via a variety of methods, such as fitting fastening, rivet fastening, and screw fastening. The guide member 40 and the flow adjusting device 30 may be fastened to each other via various methods such as fitting fastening, rivet fastening, and screw fastening.

In one example, FIG. 1 shows that the blower 10 and 20 include the first blower 10 and the second blower 20 sequentially stacked along the vertical direction. However, a concept of the present disclosure is not necessarily limited thereto. A blower may include only one blower.

The first blower 10 may include a first casing 100 that defines appearance of the blower, a first filter member 130 disposed in a lower portion of an interior of the first casing 100 to filter air, and a first blow fan 160 disposed in an upper portion of the interior of the first casing 100 to generate air flow. The second blower 20 includes a second casing 200 that defines the appearance, a second filter member 230 disposed in a lower portion of an interior of the second casing 200 to filter air, and a second blow fan 260 disposed in an upper portion of the interior of the second casing 200 to generate air flow.

In exemplary embodiments, each of the first casing 100 and the second casing 200 may have a truncated conical shape, or a cylinder shape having a diameter that gradually decreases as it extends upwardly.

The first blower 10 may further include a first base 105 disposed in the lower portion of the first blower 10. The first base 105 may be disposed on a ground and configured to support the first blower 10. The first base 105 may include a lower portion configured to contact the ground and an upper portion extending in the vertical direction from the lower portion and at least partially covered by the first casing 100. In one example, although not shown, a first lower inhale hole communicating with the interior of the first blower 10 may be further defined in a space between an inner wall of the first casing 100 and the upper portion of the first base 105. Accordingly, outside air may be inhaled into the interior of the first blower 10 through the first lower inhale hole.

The second blower 20 may further include a second base 205 disposed in the lower portion of the first blower 20. The second base 105 may be disposed on the first blower 10 and configured to support the second blower 20. The second base 205 may include a lower portion configured to contact the first blower 10 and an upper portion extending in the vertical direction from the lower portion and at least partially covered by the second casing 200. In one example, although not shown, a second lower inhale hole communicating with the interior of the second blower 20 may be disposed in a space between an inner wall of the second casing 100 and the upper portion of the second base 205, Accordingly, outside air may be inhaled into the interior of the second blower 20 through the second lower inhale hole.

In a side wall of the first casing 100, a first inhale hole 110 configured to inhale air from the outside may be defined. The first inhale hole 110 may include a plurality of through-holes passing through at least a portion of the first casing 100. Further, in a side wall of the second casing 200, a second inhale hole 210 configured to inhale air from the outside may be defined. The second inhale hole 210 may include a plurality of through-holes passing through at least a portion of the second casing 100.

The first inhale hole 110 may be configured to have a line shape extending from a bottom to a top of the first casing 100. A plurality of first inhale holes 110 may be defined in the side wall of the first casing 100. The plurality of first inhale holes 110 may be evenly arranged in the circumferential direction along an outer circumferential surface of the first casing 100 to enable the air inhale in any direction around the first casing 100. Further, the second inhale hole 210 may be configured to have a line shape extending from a bottom to a top of the second casing 200. A plurality of second inhale holes 210 may be defined in the side wall of the second casing 200. The plurality of second inhale holes 210 may be evenly arranged in the circumferential direction along the outer circumferential surface of the second casing 100 to enable air inhale in any direction around the second casing 200.

A first discharge hole 120 configured to discharge air to the outside may be defined in the top surface of the first blower 10. The first discharge hole 120 may include a plurality of through-holes passing through at least a portion of the top surface of the first blower 10. Further, a second discharge hole 220 configured to discharge air to the outside may be defined in a top surface of the second blower 20. The second discharge hole 220 may include a plurality of through-holes passing through at least a portion of a top surface of the second blower 20.

The first discharge hole 120 may be configured to have a line shape extending from a distal portion of the top surface of the first blower 10 to a portion adjacent to a central region thereof. The plurality of first discharge holes 120 may be defined in the top surface of the first blower 10. The plurality of first discharge holes 120 may be evenly arranged to surround a portion of the top surface of the first blower 10 other than a portion in which the second base 205 is disposed. Further, the second discharge hole 220 may be configured to have a line shape extending from the distal portion of the top surface of the second blower 20 to a portion adjacent to a central region thereof. The plurality of second discharge holes 220 may defined in the top surface of the second blower 20. The plurality of second discharge holes 220 may be evenly arranged to surround a portion of the top surface of the second blower 20 other than a portion in which the guide member 40 is disposed.

In exemplary embodiments, in the plan view, a collection of the plurality of first discharge holes 120 may form a ring shape covering an outer peripheral region of the top surface of the first blower 10. A collection of the plurality of second discharge holes 220 may form a ring shape covering an outer peripheral region of the top surface of the second blower 20. In one embodiment, the ring shape defined by the collection of the plurality of first discharge holes 110 may have an outer portion having a higher vertical level than an inner portion thereof. The ring shape defined by the collection of the plurality of second discharge holes 210 may have an outer portion having a higher vertical level than an inner portion thereof.

The top surface of the first blower 10 may include an outer peripheral region in which the plurality of first discharge holes 120 are disposed and a central region in which the second base 205 is disposed. The top surface of the second blower 20 may include an outer peripheral region in which the plurality of second discharge holes 220 are disposed and a central region in which the guide member 40 is disposed. In this connection, the central region of the top surface of the first blower 10 may have a lower vertical level than the outer peripheral region thereof. The central region of the top surface of the second blower 20 may have a lower vertical level than the outer peripheral region thereof.

Hereinafter, the top surface of the first blower 10 is defined to refer only to the central region in which the second base 205 is disposed, except the outer peripheral region in which the plurality of first discharge holes 120 are disposed. The top surface of the second blower 20 is defined to refer only to the central region in which the guide member 40 is disposed, except the outer peripheral region in which the plurality of second discharge holes 220 are disposed. In exemplary embodiments, each of the top surface of the first blower 10 and the top surface of the second blower 20 may have a flat surface extending in the horizontal direction.

The flow adjusting device 30 may include a rear casing which forms an appearance and is configured to define a rear surface of the flow adjusting device 30, and which includes an inhale grill configured to inhale air discharged from the blower 10 and 20. The flow adjusting device 30 may include a front casing 300 fastened to the rear casing and configured to define a front surface of the flow adjusting device 30. The front casing 300 may include a discharge grill 320 configured to discharge air inhaled through the inhale grill 310. The rear casing includes a rear panel 310 defining the rear surface of the flow adjusting device 30, and a side panel 305 extending from the rear panel 310 to the front casing 300 to define a side surface of the flow adjusting device 30. The rear panel 310 of the rear casing 300 may be configured to perform the role of the inhale grill. That is, a combination of the side panel 305 and the rear panel 310 may form the rear casing 300.

The top surface of the flow adjusting device 30 and a side wall of the front casing 300 may be configured to be spaced apart from each other. The discharge grill 320 may be disposed in a space between the top surface of the flow adjusting device 30 and the side wall of the front casing 300 to discharge air to the outside. The discharge grill 320 may have a structure surrounding the top surface of the flow adjusting device 30 in the plan view. Accordingly, the air inhale may be executed in any direction around the top surface of the flow adjusting device 30. In exemplary embodiments, one side of the discharge grill 320 may be connected to the top surface of the flow adjusting device 30, while the other side of the discharge grill 320 may be connected to the inner wall of the front casing 300.

The guide member may include a plurality of links having different lengths. An angle formed by the top surface of the flow adjusting device 30 and the top surface of the blower 10 and 20 may increase or decrease based on an operation of the plurality of links, so that an orientation of the flow adjusting device 30 may be changed from an orientation in which the top surface of the flow adjusting device 30 is horizontal with the top surface of the blower 10 and 20 to an orientation in which the top surface of the flow adjusting device 30 is perpendicular to the top surface of the blower 10 and 20. A detailed description of this will be described later with reference to FIGS. 6 to 8.

In exemplary embodiments, based on the operation of the guide member 40, the flow adjusting device 30 may be oriented in a first position in which the top surface of the flow adjusting device 30 is horizontal with the top surface of the second blower 20, may be oriented in a second position in which the top surface of the flow adjusting device 30 has a predefined angle with respect to the top surface of the second blower 20, and may be oriented in a third position in which the top surface of the flow adjusting device 30 is perpendicular to the top surface of the second blower 20.

FIGS. 1 and 2 respectively show that the flow adjusting device 30 is oriented in the first position. A detailed description of a configuration in which the flow adjusting device 30 is oriented in the second position and the third position will be described later with reference to FIGS. 7 and 8.

FIGS. 3 to 5 are diagrams for illustrating a flow adjusting device and a guide member according to exemplary embodiments of the present disclosure. Specifically, FIG. 3 is a diagram of a flow adjusting device and a guide member viewed from the front, FIG. 4 is a diagram of a flow adjusting device and a guide member viewed from a side, and FIG. 5 is a diagram of a flow adjusting device and a guide member viewed from the rear.

Referring to FIGS. 3 to 5, the flow adjusting device 30 may include a front casing 300 defining a front surface of the flow adjusting device 30, and a side panel 305 defining a side surface of the flow adjusting device 30 to prevent air from entering the casing from outside, a rear panel 310 that defines a rear surface of the flow adjusting device 30 and performs a role of an inhale grill 310, and a third blow fan 360 disposed between the front casing 300 and the rear panel 310 to blow inhaled air through the rear panel 310 toward the discharge grill 320. In one embodiment, the flow adjusting device 30 may further include a third filter member (not shown) configured to be seated on an inner surface of the rear panel 310 and disposed between the blow fan 360 and the rear panel 310 to filter inhaled air through the inhale grill.

A display 500 configured to display operation information of the air cleaner 1 may be disposed on the top surface of the flow adjusting device 30. The flow adjusting device 30 and the display 500 may be configured to work together. In exemplary embodiments, the display 500 may be configured to partially or entirely cover a top surface of the flow adjusting device 30.

The front casing 300 and the rear casing may be fastened to each other at tops thereof via first hook fastening, and may be fastened to each other at bottoms thereof via second hook fastening.

Specifically, the top portion of the side panel 305 may be configured to include a first hook 333. The top portion of the front casing 300 may be configured to include a first counterpart hook (not shown). The top portion of the side panel 305 and the top portion of the front casing 300 may be fastened to each other via fastening between the first hook 333 and the first counterpart hook 335. Further, the bottom portion of the side panel 305 may be configured to include a pair of second counterpart hooks (not shown) symmetrical to each other in the horizontal direction. The bottom portion of the front casing 300 may be configured to include a pair of second hooks (not shown) disposed at positions corresponding to the second counterpart hooks, respectively. The bottom portion of the side panel 305 and the bottom portion of the front casing 300 may be fastened to each other via fastening between the second counterpart hooks and second hooks. In one embodiment, the bottom portion of the side panel 305 may be configured to further include a magnet (not shown). The bottom portion of the front casing 300 may be configured to further include a magnet counterpart (not shown) made of metal. The coupling between the bottom portion of the side panel 305 and the bottom portion of the front casing 300 may be guided via the coupling between the magnet and the magnet counterpart.

In exemplary embodiments, the rear casing of the flow adjusting device 30 may be configured to be detachable when the flow adjusting device 30 is oriented in the third position. The filter member 350 may be configured to be detachable from the flow adjusting device 30 when the rear casing is separated from the front casing 300.

FIGS. 6 to 8 are diagrams for illustrating an orientation change of a flow adjusting device based on an operation of a guide member according to exemplary embodiments of the present disclosure. Specifically, FIG. 6 is a diagram for illustrating an operation of the guide member in a state in which the flow adjusting device is oriented in the first position, FIG. 7 is a diagram for illustrating an operation of the guide member in a state in which the flow adjusting device is oriented in the second position, and FIG. 8 is a diagram for illustrating an operation of the guide member in a state in which the flow adjusting device is oriented in the third position. In this connection, FIGS. 6 to 8 are cross-sectional views taken along a line A-A' of FIG. 5, respectively.

Referring to FIGS. 6 to 8, the guide member 40 may include a plurality of links 415 and 425 arranged below the flow adjusting device 30 and configured to change the state of the flow adjusting device 30.

Each end of each of the plurality of links 415 and 425 may be pivotably connected to an inner portion of the guide member 40, and the other end of each of the plurality of links 415 and 425 may be pivotably connected to a portion disposed on a bottom surface of the flow adjusting device 30. The flow adjusting device 30 may be configured to vary the discharge direction of the air by pivoting of at least one of the plurality of links 415 and 425 of the guide member 40.

Specifically, the guide member 40 may include a first housing 400 disposed on the top surface of the blower 10 and 20, a second housing 410 coupled to the first housing 400 to ascend and descend, a guide connector 420 disposed to pivot by being coupled to a bottom surface of the flow adjusting device 30 and a portion of the second housing 410, respectively, a first link 415 having one end coupled to an inner portion of the first housing 400 and the other end coupled to an inner portion of the guide connector 420, and a second link 425 disposed to be spaced apart from the first link 415, and having one end coupled to the inner portion of the first housing 400 and the other end coupled to the inner portion of the guide connector 420. In this connection, the second link 425 may have a length smaller than that of the first link 415.

The bottom surface of the flow adjusting device 30 may have a convex portion protruding toward the first housing 400, and a side wall of the guide connector 420 may have a concave portion having a shape corresponding to the convex portion of the flow adjusting device 30. The bottom surface of the flow adjusting device 30 and the side wall of the guide connector 420 may be engaged with each other. The bottom surface of the flow adjusting device 30 and the side wall of the guide connector 420 may be fastened to each other and fixed via various methods such as fitting fastening, rivet fastening, and screw fastening.

In an exemplary embodiment, a space in which the second housing 410 may be accommodated may be defined inside the first housing 400. The space defined inside the first housing 400 may have a larger volume than the second housing 410 such that the second housing 410 does not collide with an inner wall of the first housing 400 when pivoting. In one embodiment, the inner wall of the first housing 400 may have a partially curved portion, and the second housing 410 may pivot along the curved portion of the inner wall of the first housing 400.

A space in which the first link 415 and the second link 425 may pivot may be defined inside the second housing 410, and a space in which the other end of the first link 415 and the other end of the second link 425 may pivot may be defined inside the guide connector 420.

FIGS. 6 to 8 illustrate that each of the first housing 400, the second housing 410, and the guide connector 420 has a specific shape, but the concept of the present disclosure is not necessarily limited thereto. That is, each of the first housing 400, the second housing 410, and the guide connector 420 may have various shapes within a range that does not impair an original function thereof.

In addition, although not shown, an inner circumferential surface of the guide connector 420 covered by the second housing 410 may include openings respectively communicating with the first link 415 and the second link 425, and each of the openings may extend by a radius at which each of the first link 415 and the second link 425 pivots.

In an exemplary embodiment, when the air cleaner 1 includes the first blower 10 and the second blower 20 sequentially stacked, the guide member 40 may be disposed on the second blower 20, for example, on the second blow fan 260. In one embodiment, when the air cleaner 1 includes only one blower, for example, the first blower 10, the guide member 40 may be disposed on the first blower 10, for example, on the first blow fan 160. Otherwise, when the air cleaner 1 includes only the second blower 20, the guide member 40 may be disposed on the second blower 20, for example, on the second blow fan 260.

The first housing 400 may include a first link connector 413 disposed to be coupled to one end of the first link 415, and the guide connector 420 may include a second link connector 417 disposed to be coupled to the other end of the first link 415. One end of the first link 415 may be connected to the first link connector 413 to pivot about the first link connector 413, and the other end of the first link 415 may be connected to the second link connector 417 to pivot about the second link connector 417.

The first housing 400 may further include a third link connector 423 disposed to be coupled to one end of the second link 425, and the guide connector 420 may further include a fourth link connector 427 disposed to be coupled to the other end of the second link 425. One end of the second link 425 may be connected to the third link connector 423 to pivot about the third link connector 423, and the other end of the second link 425 may be connected to the fourth link connector 427 to pivot about the fourth link connector 427.

In an exemplary embodiment, the shortest distance between the guide connector 420 and the third link connector 423 may be smaller than the shortest distance between the guide connector 420 and the first link connector 413.

In an exemplary embodiment, the second link connector 417 may be disposed inside the guide connector 420 to be spaced apart from an inner circumferential surface of the guide connector 420, and the fourth link connector 427 may be disposed inside the guide connector 420 to be adjacent to an inner circumferential surface of the guide connector 420.

In an exemplary embodiment, the second link 425 may be located inside the first housing 400 and forward of the first link 415 in the horizontal direction, and may be disposed relatively adjacent to the inner wall of the first housing 410.

The second link 425 may be configured to pivot in the same direction as a pivot direction of the first link 415 when the first link 415 pivots. That is, when the first link 415 pivots in one direction (shown as a counterclockwise direction in FIGS. 6 to 8, and hereinafter, referred to as a first direction) about the first link connector 413, the second link 425 indirectly connected to the first link 415 through the guide connector 420 may also pivot in the first direction about the third link connector 423.

In addition, because the guide connector 420 is coupled to a portion of the second housing 410, as the first link 415 pivots, the second housing 410 may also pivot about the first link connector 413 together with the first link 415.

In one example, when the first link 415 pivots in the first direction, the guide connector 420 may be configured to pivot in a direction (shown in a clockwise direction in FIGS. 6 to 8, and hereinafter, referred to as a second direction) opposite to the pivot direction of the first link 415. The fourth link connector 427 disposed inside the guide connector 420 may also pivot in the second direction together with the guide connector 420. That is, the fourth link connector 427 may be connected to the second link connector 417 to pivot about the second link connector 417, as shown in FIG. 6.

When the first link 415 and the second housing 410 pivot together in the first direction about the first link connector 413 in the first direction, the guide connector 420 disposed at a distance from the first link connector 413 may be controlled to ascend from the first housing 400.

The guide connector 420 may be configured to pivot in the second direction while being controlled to ascend from the first housing 400, and the fourth link connector 427 disposed inside the guide connector 420 may also be configured to pivot in the second direction together with the guide connector 420.

Specifically, the guide connector 420 may be connected to the first link 415 through the second link connector 417, and may be connected to the second link 425 through the fourth link connector 427. In this connection, the second link 425 having the length smaller than that of the first link 415 may be disposed forward of the first link 415 in the horizontal direction, the fourth link connector 427 to which the other end of the second link 425 is coupled is disposed to be spaced apart from the inner circumferential surface of the guide connector 420, and the second link connector 417 to which the other end of the first link 415 is coupled is disposed adjacent to the inner circumferential surface of the guide connector 420. Therefore, when the first link 415 and the second housing 410 pivot together, the guide connector 420 may be controlled to ascend from the first housing 400, and at the same time, be controlled to pivot in the second direction. In this connection, the fourth link connector 427 disposed adjacent to the inner circumferential surface of the guide connector 420 may be controlled to pivot about the second link connector 417 disposed to be spaced apart from the inner circumferential surface of the guide connector 420.

Accordingly, as the second housing 410 pivots in the first direction, and at the same time, the guide connector 420 pivots in the second direction, the state of the flow adjusting device 30 may be changed from the state in which the top surface of the flow adjusting device 30 is horizontal with the top surface of the blower 10 and 20, that is, the state in which the flow adjusting device 30 is oriented in the first position to the state in which the top surface of the flow adjusting device 30 is perpendicular to the top surface of the blower 10 and 20, that is, the state in which the flow adjusting device 30 is oriented in the third position.

In one example, the concept of the operation method of the guide connector 420 described so far may be applied in reverse. That is, when the second housing 410 pivots in the second direction, the guide connector 420 may be configured to descend toward the first housing 410, and at the same time, to pivot in the first direction. At this time, the fourth link connector 427 disposed adjacent to the inner circumferential surface of the guide connector 420 may also be configured to pivot in the first direction together with the guide connector 420.

Accordingly, as the second housing 410 pivots in the second direction, and at the same time, the guide connector 420 pivots in the first direction, the state of the flow adjusting device 30 may be changed from the state in which the top surface of the flow adjusting device 30 is perpendicular to the top surface of the blower 10 and 20, that is, the state in which the flow adjusting device 30 is oriented in the third position to the state in which the top surface of the flow adjusting device 30 is horizontal with the top surface of the blower 10 and 20, that is, the state in which the flow adjusting device 30 is oriented in the first position.

Referring to FIGS. 7 and 8 together, as the state of the flow adjusting device 30 changes from the first position to the third position, each of the second link connector 417 and the fourth link connector 427 may be positioned at a higher vertical level than before. In this connection, because the second link 425 may have the length smaller than that of the first link 415, a vertical level increase degree of the fourth link connector 427 connected to the other end of the second link 425 may be less than a vertical level increase degree of the second link connector 417 connected to the other end of the first link 415. Accordingly, the fourth link connector 427 may be disposed at a lower vertical level than the second link connector 417 in a state in which the flow adjusting device 30 is oriented in the second position or the third position.

Referring to FIG. 6 again, the first link 415 and the second link 425 may be arranged on different planes, and the first link 415 and the second link 425 may respectively have portions overlapping with each other while the flow adjusting device 30 is oriented in the first position. However, the concept of the present disclosure is not necessarily limited thereto. That is, the first link 415 and the second link 425 may be arranged on the same plane. In this case, the first link 415 and the second link 425 may not respectively have the portions overlapping with each other while the flow adjusting device 30 is oriented in the first position. Otherwise, the first link 415 and the second link 425 may be arranged on different planes, and may not respectively have the portions overlapping with each other while the flow adjusting device 30 is oriented in the first position.

As described above, the air cleaner 1 according to exemplary embodiments of the present disclosure may include the sequentially stacked blowers 10 and 20, the guide member 40, and the flow adjusting device 30, and the guide member 40 may include the plurality of links 415 and 425. In this connection, said one end of each of the plurality of links 415 and 425 may be pivotably connected to an inner portion of the guide member 40, and the other end of each of the plurality of links 415 and 425 may be pivotably connected to a portion disposed on the bottom surface of the flow adjusting device 30. The flow adjusting device 30 may be configured to vary the discharge direction of the air by the pivoting of the at least one of the plurality of links 415 and 425 of the guide member 40.

In this connection, the angle formed between the top surface of the flow adjusting device 30 and the top surface of the blower 10 and 20 may increase or decrease based on the operations of the plurality of links 415 and 425. The state of the flow adjusting device 30 may be changed from the first position in which the top surface of the flow adjusting device 30 is horizontal with the top surface of the blower 10 and 20 to the third position in which the top surface of the flow adjusting device 30 is perpendicular to the top surface of the blower 10 and 20.

Therefore, the top surface of the flow adjusting device 30 may be oriented to be perpendicular to the top surface of the blower 10 and 20. Thus, the air discharged from the blower 10 and 20 may be blown farther away in the desired direction through the flow adjusting device 30.

In addition, the guide member 40 according to exemplary embodiments of the present disclosure may have a stable and improved appearance because, compared to a driving scheme of the conventional guide member configured to be movable by being inserted into the blower or withdrawn from the top surface of the blower, not only more concise and natural driving is possible, but also a structure for driving the guide member 40 is not exposed to the outside.

Although various embodiments of the present disclosure have been described above in detail, those having ordinary knowledge in the technical field to which the present disclosure belongs may realize that various modifications may be made to the above-described embodiment as long as they do not depart from the scope of the present disclosure. Therefore, the scope of rights of the present disclosure should not be limited to the described embodiment and should be determined not only by the claims to be described later but also by equivalents thereto.

The invention claimed is:
1. An air cleaner comprising:
a blower configured to inhale air from an outside, filter the inhaled air, and discharge the filtered air;
a flow adjusting device disposed above the blower and configured to inhale the filtered air discharged from the blower, adjust a discharge direction of the inhaled filtered air, and discharge the filtered air in the adjusted discharge direction; and
a guide member disposed below the flow adjusting device and configured to change a state of the flow adjusting device,
wherein the guide member includes:
a first housing disposed on an upper surface of the blower;
a second housing coupled to the first housing so as to ascend and descend;
a guide connector rotatably coupled to a bottom surface of the flow adjusting device and to a portion of the second housing;
a first link having a first end pivotably coupled to an inner portion of the first housing and a second end pivotably coupled to an inner portion of the guide connector; and
a second link spaced apart from the first link, the second link having a first end pivotably coupled to the inner portion of the first housing and a second end pivotably coupled to the inner portion of the guide connector, and the second link having a length shorter than a length of the first link, and
wherein the flow adjusting device is configured to change the discharge direction of the filtered air by pivoting at least one of the first and second links.

2. The air cleaner of claim 1, wherein the flow adjusting device is movable between a first position, a second position, and a third position, based on a movement of the guide member,
wherein in the first position, an upper surface of the flow adjusting device is parallel with the upper surface of the blower,
wherein in the second position, the upper surface of the flow adjusting device forms a predefined acute angle with respect to the upper surface of the blower, and
wherein in the third position, the upper surface of the flow adjusting device is perpendicular to the upper surface of the blower.

3. The air cleaner of claim 1, wherein the first housing includes a first link connector coupled to the first end of the first link,
wherein the guide connector includes a second link connector coupled to the second end of the first link,
wherein the first end of the first link pivots about the first link connector, and
wherein the second end of the first link pivots about the second link connector.

4. The air cleaner of claim 3, wherein the first housing further includes a third link connector coupled to the first end of the second link,
wherein the guide connector further includes a fourth link connector coupled to the second end of the second link,
wherein the first end of the second link pivots about the third link connector, and
wherein the second end of the second link pivots about the fourth link connector.

5. The air cleaner of claim 4, wherein as the first link pivots, the second link pivots in a same direction as a pivot direction of the first link.

6. The air cleaner of claim 5, wherein the second link is configured to pivot through a pivot range greater than a pivot range of the first link.

7. The air cleaner of claim 5, wherein the second housing pivots about the first link connector together with the first link.

8. The air cleaner of claim 5, wherein as the first link pivots,
the guide connector pivots in a direction opposite to the pivot direction of the first link, and wherein the fourth link connector is configured to pivot about the second link connector together with the guide connector.

9. The air cleaner of claim 5, wherein as the second housing pivots in a first direction, the guide connector ascends from the first housing and pivots in a second direction opposite to the first direction.

10. The air cleaner of claim 9, wherein the guide connector is configured to pivot in the second direction together with the fourth link connector.

11. The air cleaner of claim 10, wherein as the second housing pivots in the first direction, and at the same time the guide connector pivots in the second direction, the flow adjusting device moves from a first position to a third position.

12. The air cleaner of claim 9, wherein as the second housing pivots in the second direction, the guide connector descends toward the first housing and pivots in the first direction.

13. The air cleaner of claim 12, wherein as the guide connector pivots in the first direction, the fourth link connector and the guide connector pivot in the first direction.

14. The air cleaner of claim 13, wherein the flow adjusting device is movable between a first position, a second position, and a third position, based on a movement of the guide member,
wherein in the first position, an upper surface of the flow adjusting device is parallel with the upper surface of the blower,
wherein in the second position, the upper surface of the flow adjusting device forms a predefined acute angle with respect to the upper surface of the blower,
wherein in the third position, the upper surface of the flow adjusting device is perpendicular to the upper surface of the blower, and
wherein as the second housing pivots in the second direction and the guide connector pivots in the first direction, the flow adjusting device moves from the third position to the first position.

15. The air cleaner of claim 4, wherein the flow adjusting device is movable between a first position, a second position, and a third position, based on a movement of the guide member,
wherein in the first position, the upper surface of the flow adjusting device is parallel with an upper surface of the blower,
wherein in the second position, the upper surface of the flow adjusting device forms a predefined acute angle with respect to the upper surface of the blower,
wherein in the third position, the upper surface of the flow adjusting device is perpendicular to the upper surface of the blower, and
wherein as the flow adjusting device moves from the first position to the third position, the second link connector and the fourth link connector are moved to a higher vertical height.

16. The air cleaner of claim 15, wherein a vertical level increase amount of the fourth link connector is less than a vertical level increase amount of the second link connector.

17. The air cleaner of claim 16, wherein when the flow adjusting device is in the second position or the third position, the fourth link connector is disposed at a lower vertical level than the second link connector.

18. The air cleaner of claim 2, wherein the first link and the second link are arranged on different planes, and
wherein the first link and the second link have portions overlapping with each other when the flow adjusting device is in the first position.

19. The air cleaner of claim 1, wherein the blower includes a first blower configured to inhale the air, filter the inhaled air, and discharge the filtered air at a first vertical height, and a second blower disposed on a top surface the first blower and configured to inhale air, filter the inhaled air, and discharge the filtered air at a second vertical height higher than the first vertical height,
wherein the first blower includes a first casing, a first filter member disposed in a lower portion of an interior of the first casing to filter the air, and a first blow fan disposed in an upper portion of the interior of the first casing to generate air flow,
wherein the second blower includes a second casing, a second filter member disposed in a lower portion of an interior of the second casing to filter the air, and a second blow fan disposed in an upper portion of the interior of the second casing to generate air flow, and
wherein the guide member is disposed between the second blow fan and the flow adjusting device.

* * * * *